United States Patent
Choi et al.

(10) Patent No.: US 11,758,424 B2
(45) Date of Patent: Sep. 12, 2023

(54) METHOD AND DEVICE FOR MONITORING CONTROL SIGNAL IN WIRELESS COMMUNICATION SYSTEM

(71) Applicant: LG ELECTRONICS INC., Seoul (KR)

(72) Inventors: Seunghwan Choi, Seoul (KR); Suckchel Yang, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/978,118

(22) Filed: Oct. 31, 2022

(65) Prior Publication Data

US 2023/0224736 A1 Jul. 13, 2023

(30) Foreign Application Priority Data

Jan. 10, 2022 (KR) .................. 10-2022-0003598

(51) Int. Cl.
| | |
|---|---|
| *H04W 74/08* | (2009.01) |
| *H04W 24/08* | (2009.01) |
| *H04L 27/26* | (2006.01) |
| *H04W 72/0446* | (2023.01) |
| *H04W 72/23* | (2023.01) |

(52) U.S. Cl.
CPC ....... *H04W 24/08* (2013.01); *H04L 27/26025* (2021.01); *H04W 72/0446* (2013.01); *H04W 72/23* (2023.01)

(58) Field of Classification Search
CPC ............... H04W 24/08; H04W 72/23; H04W 72/0446; H04L 27/26025
See application file for complete search history.

(56) References Cited

U.S. PATENT DOCUMENTS

2022/0304046 A1* 9/2022 Lin ................. H04W 72/23

FOREIGN PATENT DOCUMENTS

| WO | WO-2022212688 A1 * | 10/2022 |
| WO | WO-2022216603 A1 * | 10/2022 |

OTHER PUBLICATIONS

U.S. Appl. No. 63/170,997, filed Apr. 5, 2021. (Year: 2021).*
U.S. Appl. No. 63/174,975, filed Apr. 14, 2021. (Year: 2021).*
U.S. Appl. No. 63/228,875, filed Aug. 3, 2021. (Year: 2021).*
U.S. Appl. No. 63/250,893, filed Sep. 30, 2021. (Year: 2021).*
LG Electronics, "PDCCH monitoring enhancements to support NR above 52.6 GHz," 3GPP TSG-RAN WG1 #106-e, R1-2107436, Aug. 2021, 8 pages.
ZTE, "Discussion on the PDCCH monitoring enhancements for 52.6 to 71 GHz," 3GPP TSG-RAN WG1 #106-bis-e, R1-2108935, Oct. 2021, 9 pages.
LG Electronics, "Discussion on PDCCH monitoring for reduced capability NR devices," 3GPP TSG-RAN WG1 #103-e, R1-2008049, Nov. 2020, 6 pages.

(Continued)

*Primary Examiner* — Melvin C Marcelo
(74) *Attorney, Agent, or Firm* — LEE HONG DEGERMAN KANG & WAIMEY

(57) ABSTRACT

A method and device for monitoring a signal in a wireless communication system includes a PDCCH monitoring operation based on a combination of X and Y. In detail, in order to monitor a PDCCH in Y slots, a duration of a search space is restricted to be an integer multiple of L.

11 Claims, 7 Drawing Sheets

(56) References Cited

OTHER PUBLICATIONS

Moderator (Lenovo), "Feature lead summary #2 for [104b-e-NR-52-71GHz-02] Email Discussion/approval on PDCCH Monitoring Enhancements," 3GPP TSG-RAN WG1 #104-e, R1-2104057, Apr. 2021, 95 pages.

LG Electronics, "Discussion on PDCCH monitoring adaption," 3GPP TSG-RAN Meeting #97, R1-1906698, May 2019, 4 pages.

Korean Intellectual Property Office Application Serial No. 10-2022-0114427, Korean Prior Art Search Report dated Sep. 20, 2022, 5 pages.

* cited by examiner

[Fig. 1]
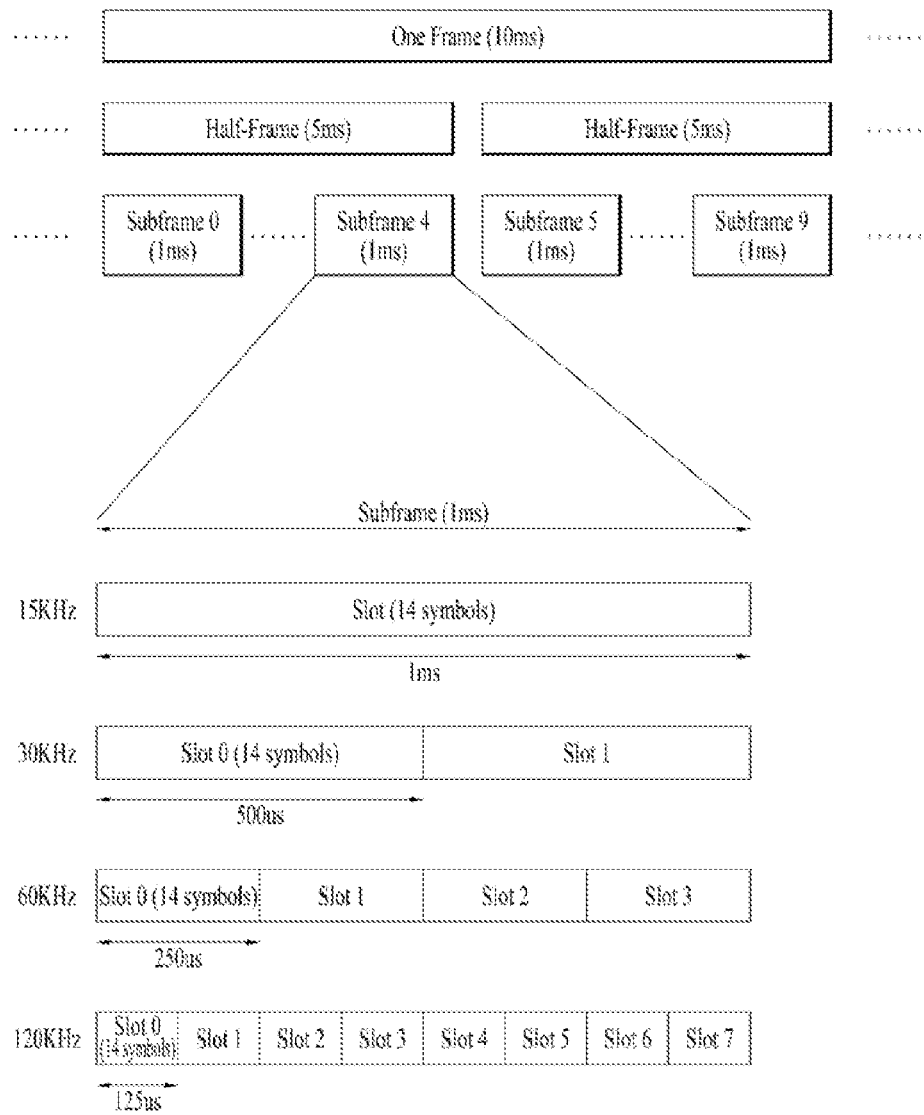

[Fig. 2]
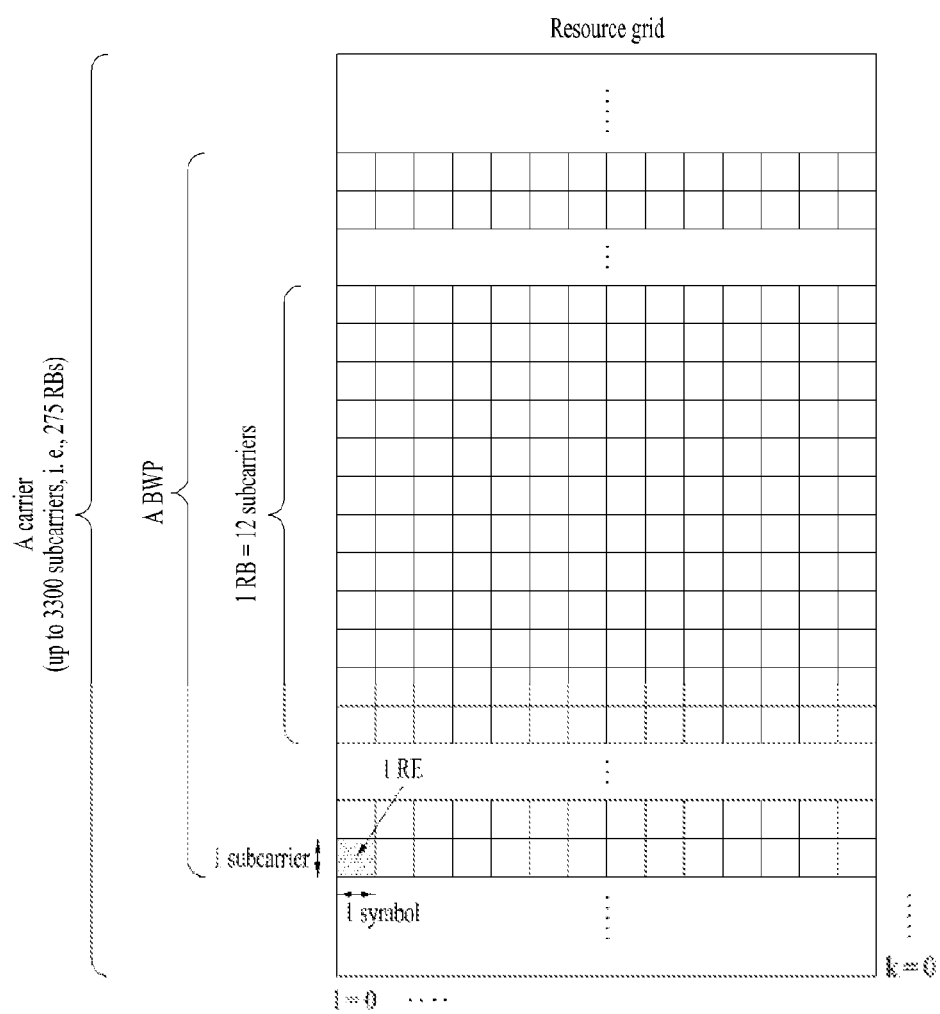

[Fig. 3]
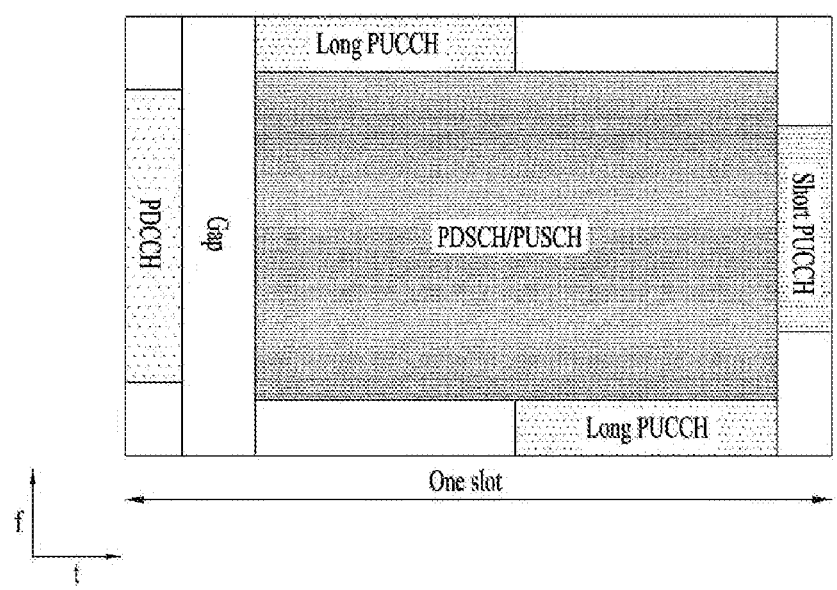

[Fig. 4]
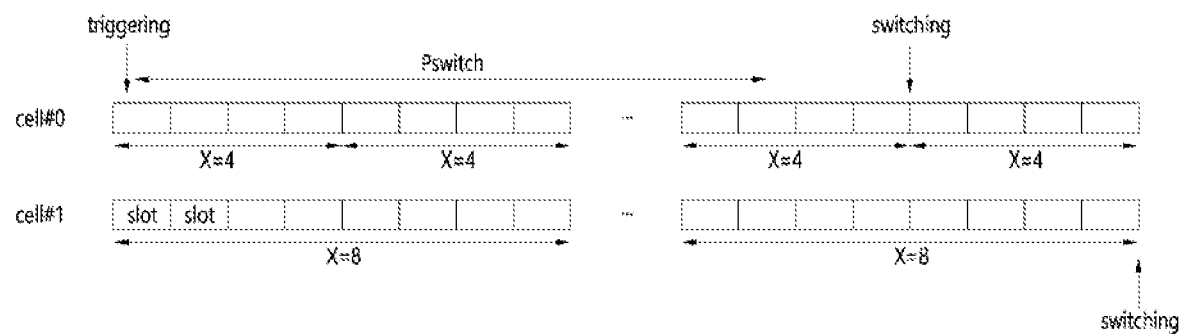

[Fig. 5]
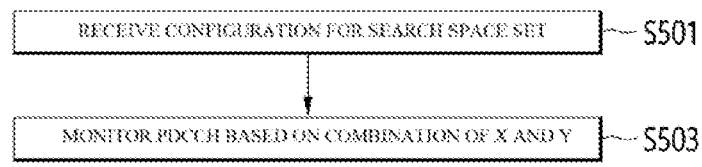

【Fig. 6】
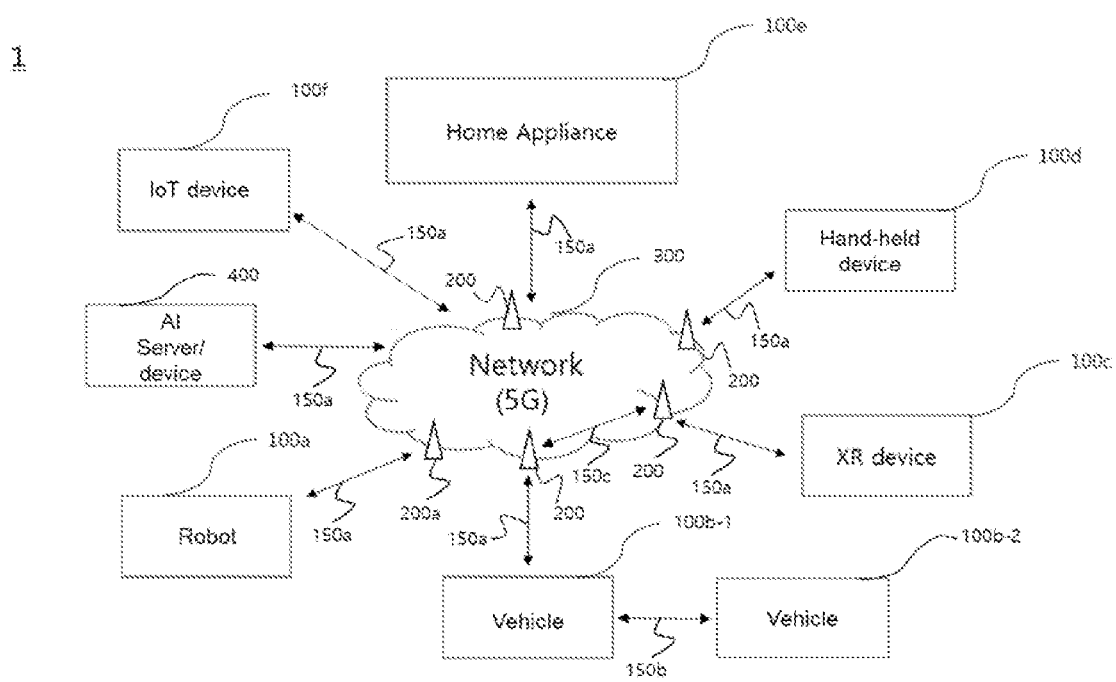
【Fig. 7】
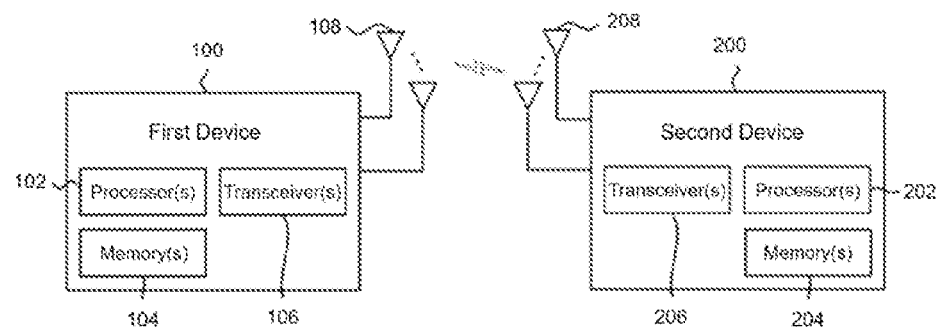

【Fig. 8】
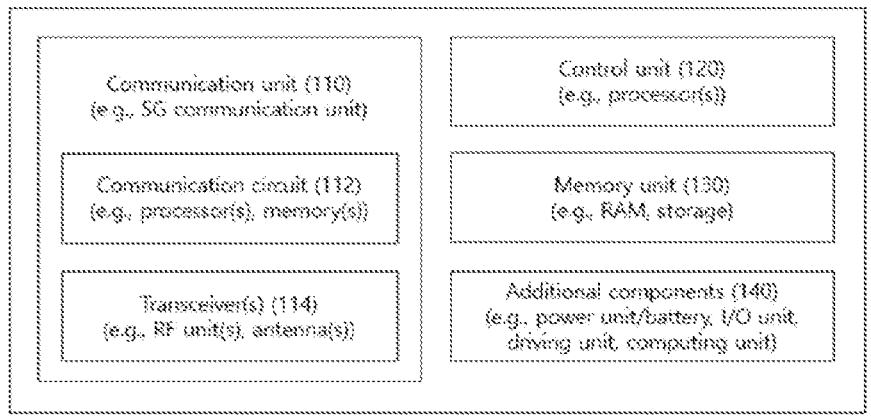
【Fig. 9】
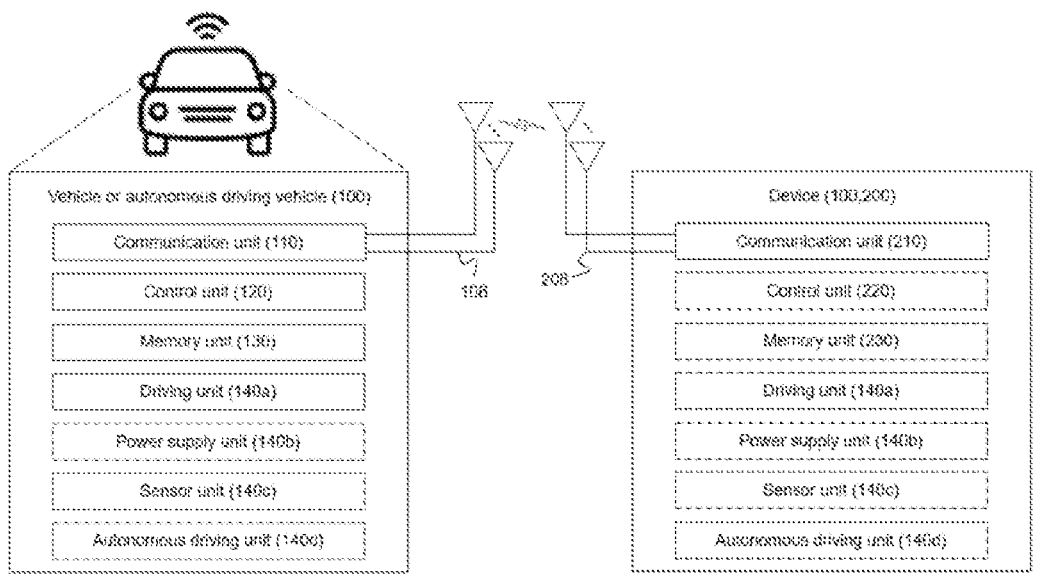

METHOD AND DEVICE FOR MONITORING CONTROL SIGNAL IN WIRELESS COMMUNICATION SYSTEM

CROSS REFERENCE TO RELATED APPLICATION(S)

Pursuant to 35 U.S.C. § 119, this application claims the benefit of earlier filing date and right of priority to Korean Application No. 10-2022-0003598, filed on Jan. 10, 2022, the contents of which are all incorporated by reference herein in their entirety.

BACKGROUND OF THE DISCLOSURE

Field of the Disclosure

The present disclosure relates to a method and apparatus for use in a wireless communication system.

Discussion of the Related Art

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of code division multiple access (CDMA) system, frequency division multiple access (FDMA) system, time division multiple access (TDMA) system, orthogonal frequency division multiple access (OFDMA) system, single carrier frequency division multiple access (SC-FDMA) system, and the like.

SUMMARY OF THE DISCLOSURE

The object of the present disclosure is to provide a method and apparatus for monitoring a control signal efficiently in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

The present disclosure provides a method and apparatus for monitoring a control signal in a wireless communication system.

According to an aspect of the present disclosure, a method of monitoring a control signal by a user equipment (UE) in a wireless communication system includes receiving a configuration for a search space set, and monitoring a physical downlink control channel (PDCCH) based on a combination of X and Y, wherein the X is a number of consecutive slots included in a slot-group, the slot-group is consecutively repeated without overlapping, and the Y is a number of consecutive slots within X slots, the combination of the X and the Y is determined based on the configuration, the configuration includes information on a duration, the duration is restricted to be an integer multiple of L, and the L is 4.

Another aspect of the present disclosure may provide a device, a processor, and a storage medium for performing the signal monitoring method.

In the method and devices, the configuration may include information on periodicity and offset, and the periodicity and the offset may be restricted to be an integer multiple of L.

The devices may include an autonomous driving vehicle for communicating with at least a UE, a network, and another autonomous driving vehicle other than the device.

The aspects of the disclosure are only a part of the preferred embodiments of the disclosure, and various embodiments based on technical features of the disclosure may be devised and understood by the person with ordinary skill in the art based on the detailed description of the disclosure.

BRIEF DESCRIPTION OF THE DRAWINGS

FIG. 1 illustrates a radio frame structure.

FIG. 2 illustrates a resource grid during the duration of a slot.

FIG. 3 shows an example in which a physical channel is mapped in a slot.

FIGS. 4 to 5 show a signal monitoring method according to an embodiment of the present disclosure.

FIGS. 6 to 9 illustrate devices according to an embodiment of the present disclosure.

DETAILED DESCRIPTION OF THE DISCLOSURE

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

For clarity of description, the present disclosure will be described in the context of a 3GPP communication system (e.g., LTE and NR), which should not be construed as limiting the spirit of the present disclosure. LTE refers to a technology beyond 3GPP TS 36.xxx Release 8. Specifically, the LTE technology beyond 3GPP TS 36.xxx Release 10 is called LTE-A, and the LTE technology beyond 3GPP TS 36.xxx Release 13 is called LTE-A pro. 3GPP NR is the technology beyond 3GPP TS 38.xxx Release 15. LTE/NR may be referred to as a 3GPP system. "xxx" specifies a technical specification number. LTE/NR may be generically referred to as a 3GPP system. For the background technology, terminologies, abbreviations, and so on as used herein, refer to technical specifications published before the present disclosure. For example, the following documents may be referred to.

3GPP NR 38.211: Physical channels and modulation
38.212: Multiplexing and channel coding
38.213: Physical layer procedures for control
38.214: Physical layer procedures for data
38.300: NR and NG-RAN Overall Description
38.331: Radio Resource Control (RRC) protocol specification FIG. 1 illustrates a radio frame structure used for NR.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS (15 * 2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: number of symbols in a slot
* $N^{frame,u}_{slot}$: number of slots in a frame
* $N^{subframe,u}_{slot}$: number of slots in a subframe Table 2 illustrates that the number of symbols per slot, the number of slots per frame, and the number of slots per subframe vary according to SCSs in an extended CP case.

TABLE 2

| SCS (15 * 2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

NR may support various numerologies (or subcarrier spacings (SCSs)) to provide various 5G services. For example, NR may support a wide area in conventional cellular bands for an SCS of 15 kHz and support a dense urban area and a wide carrier bandwidth with lower latency for an SCS of 30 or 60 kHz. For an SCS of 60 kHz or above, NR may support a bandwidth higher than 24.25 GHz to overcome phase noise.

NR frequency bands may be divided into two frequency ranges: frequency range 1 (FR1) and frequency range 2 (FR2). FR1 and FR2 may be configured as shown in Table A6 below. FR 2 may mean a millimeter wave (mmW).

TABLE 3

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600 MHz | 60, 120, 240 kHz |

FIG. 2 illustrates a resource grid during the duration of one slot.

A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

In a wireless communication system, a UE receives information from a BS in downlink (DL), and the UE transmits information to the BS in uplink (UL). The information exchanged between the BS and UE includes data and various control information, and various physical channels/signals are present depending on the type/usage of the information exchanged therebetween. A physical channel corresponds to a set of resource elements (REs) carrying information originating from higher layers. A physical signal corresponds to a set of REs used by physical layers but does not carry information originating from the higher layers. The higher layers include a medium access control (MAC) layer, a radio link control (RLC) layer, a packet data convergence protocol (PDCP) layer, a radio resource control (RRC) layer, and so on.

DL physical channels include a physical broadcast channel (PBCH), a physical downlink shared channel (PDSCH), and a physical downlink control channel (PDCCH). DL physical signals include a DL reference signal (RS), a primary synchronization signal (PSS), and a secondary synchronization signal (SSS). The DL RS includes a demodulation reference signal (DM-RS), a phase tracking reference signal (PT-RS), and a channel state information reference signal (CSI-RS). UL physical channel include a physical random access channel (PRACH), a physical uplink shared channel (PUSCH), and a physical uplink control channel (PUCCH). UL physical signals include a UL RS. The UL RS includes a DM-RS, a PT-RS, and a sounding reference signal (SRS).

FIG. 3 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

In the present disclosure, a base station (BS) may be, for example, a gNode B (gNB).

DL Physical Channel/Signal (1) PDSCH

A PDSCH carries DL data (e.g., DL-shared channel transport block (DL-SCH TB)). The TB is coded into a codeword (CW) and then transmitted after scrambling and modulation processes. The CW includes one or more code blocks (CBs). One or more CBs may be grouped into one code block group (CBG). Depending on the configuration of a cell, the PDSCH may carry up to two CWs. Scrambling and modulation may be performed for each CW, and modulation symbols generated from each CW may be mapped to one or more layers. Each layer may be mapped to resources together with a DMRS after precoding and transmitted on a corresponding antenna port. The PDSCH may be dynamically scheduled by a PDCCH (dynamic scheduling). Alternatively, the PDSCH may be semi-statically scheduled based on higher layer (e.g., RRC) signaling (and/or Layer 1 (L1) signaling (e.g., PDCCH)) (configured scheduling (CS)). Therefore, in the dynamic scheduling, PDSCH transmission is accompanied by the PDCCH, whereas in the CS, PDSCH transmission may not be accompanied by the PDCCH. The CS may include semi-persistent scheduling (SPS).

(2) PDCCH

A PDCCH carries Downlink Control Information (DCI). For example, the PDCCH (i.e., DCI) may carry: transmission formats and resource allocation of a DL-SCH; frequency/time resource allocation information on an uplink shared channel (UL-SCH); paging information on a paging channel (PCH); system information on a DL-SCH; time/frequency resource allocation information on a higher layer control message such as a random access response (RAR) transmitted over a PDSCH; transmit power control commands; and information on activation/deactivation of SPS/CS. Various DCI formats may be provided depending on information in DCI.

Table 4 shows DCI formats transmitted over the PDCCH.

TABLE 4

| DCI format | Usage |
|---|---|
| 0_0 | Scheduling of PUSCH in one cell |
| 0_1 | Scheduling of one or multiple PUSCH in one cell, or indicating downlink feedback information for configured grant PUSCH (CG-DFI) |
| 1_0 | Scheduling of PDSCH in one cell |
| 1_1 | Scheduling of PDSCH in one cell, and/or triggering one shot HARQ-ACK codebook feedback |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a groug of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a CBG-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or UL scheduling information. DCI format 2_0 may be used to provide dynamic slot format information (e.g., dynamic SFI) to the UE, and DCI format 2_1 may be used to provide downlink pre-emption information to the UE. UEs defined as one group may be provided with DCI format 2_0 and/or DCI format 21 over a group common PDCCH, which is a PDCCH defined for a group of UEs.

The PDCCH/DCI may include a cyclic redundancy check (CRC), and the CRC may be masked/scrambled with various identifiers (e.g., radio network temporary identifier (RNTI)) according to the owner or purpose of the PDCCH. For example, if the PDCCH is for a specific UE, the CRC may be masked with a cell-RNTI (C-RNTI). If the PDCCH relates to paging, the CRC may be masked with a paging-RNTI (P-RNTI). If the PDCCH relates to system information (e.g., system information block (SIB)), the CRC may be masked with a system information RNTI (SI-RNTI). If the PDCCH relates to a random access response, the CRC may be masked with a random access-RNTI (RA-RNTI).

Table 5 shows the usage of the PDCCH and transport channels according to the type of RNTI. Here, the transport channel means a transport channel related to data carried by a PDSCH/PUSCH scheduled by the PDCCH.

TABLE 5

| RNTI | Usage | Transport Channel |
|---|---|---|
| P-RNTI | Paging and System Information change notification | PCH(Paging Channel) |
| SI-RNTI | Broadcast of System Information | DL-SCH |
| RA-RNTI | Random Access Response | DL-SCH |
| Temporary C-RNTI | Contention Resolutions (when no valid C-RNTI is available) | DL-SCH |
| Temporary C-RNTI | Msg3 transmission | UL-SCH |
| C-RNTI, MCS(Modulation and Coding Scheme)-C-RNTI | Dynamically scheduled unicast transmission | UL-SCH |
| C-RNTI | Dynamically scheduled unicast transmission | DL-SCH |
| MCS-C-RNTI | Dynamically scheduled unicast transmission | DL-SCH |
| C-RNTI | Triggering of PDCCH ordered radons access | N/A |
| CS(Configued Scheduling)- | Configured scheduled unicast transmission | DL-SCH, UL-SCH |

TABLE 5-continued

| RNTI | Usage | Transport Channel |
| --- | --- | --- |
| RNTI | (activation, reactivation and retransmission) | |
| CS-RNTI | Configured scheduled unicast transmission (deactivation) | N/A |
| TPC(Transmit Power Control)-PUCCH-RNTI | PUCCH power control | N/A |
| TPC-PUSCH-RNTI | PUSCH power control | N/A |
| TPC-SRS-RNTI | SRS trigger and power control | N/A |
| INT(Interruption)-RNTI | Indication pre-emption in DL | N/A |
| SFI(Slot Fomat Indication)-RNTI | Slot Format Indication on the given cell | N/A |
| SP(Semi-persistent)-CSI(Channel State Information)-RNTI | Activation of Semi-persistent CSI reporting an PUSCH | N/A |

For the PDCCH, a fixed modulation scheme may be used (e.g., quadrature phase shift keying (QPSK)). One PDCCH may include 1, 2, 4, 8, or 16 control channel elements (CCEs) depending on the aggregation level (AL). One CCE may include 6 resource element groups (REGs), and one REG may be defined by one OFDMA symbol and one (P)RB.

The PDCCH may be transmitted in a control resource set (CORESET). The CORESET corresponds to a set of physical resources/parameters used to carry the PDCCH/DCI within a BWP. For example, the CORESET may include a set of REGs with a given numerology (e.g., SCS, CP length, etc.). The CORESET may be configured by system information (e.g., MIB) or UE-specific higher layer (e.g., RRC) signaling. For example, the following parameters/information may be used to configure the CORESET. One UE may be configured with one or more CORESETs, and a plurality of CORESETs may overlap in the time/frequency domain.

controlResourceSetId: this parameter/information indicates the identifier (ID) of the CORESET.

frequencyDomainResources: this parameter/information indicates frequency-domain resources of the CORESET. The frequency-domain resources may be indicated by a bitmap, and each bit corresponds to an RB group (=6 consecutive RBs). For example, the most significant bit (MSB) of the bitmap corresponds to the first RB group in the BWP. An RB group corresponding to a bit with a value of 1 may be allocated as a frequency-domain resource of the CORESET.

duration: this parameter/information indicates time-domain resources of the CORESET. The parameter/information duration may indicate the number of consecutive OFDMA symbols included in the CORESET. For example, duration has a value of 1-3.

cce-REG-MappingType: this parameter/information indicates a CCE-to-REG mapping type. An interleaved type and a non-interleaved type may be supported.

precoderGranularity: this parameter/information indicates a precoder granularity in the frequency domain.

tci-StatesPDCCH: this parameter/information indicates information (e.g., TCI-StateID) on a transmission configuration indication (TCI) state for the PDCCH. The TCI state may be used to provide a quasi-co-location (QCL) relationship between DL RS(s) in an RS set (TCI-state) and a PDCCH DMRS port.

tci-PresentInDCI: this parameter/information indicates whether a TCI field is included in DCI.

pdcch-DMRS-ScramblingID: this parameter/information indicates information used for initialization of a PDCCH DMRS scrambling sequence.

For PDCCH reception, the UE may monitor (e.g., blind decoding) a set of PDCCH candidates in the CORESET. The PDCCH candidate may mean CCE(s) monitored by the UE for PDCCH reception/detection. PDCCH monitoring may be performed in one or more CORESETs in an active DL BWP on each active cell in which the PDCCH monitoring is configured. The set of PDCCH candidates monitored by the UE may be defined as a PDCCH search space (SS) set. The SS set may be classified into a common search space (CSS) set or a UE-specific search space (USS) set.

Table 6 shows PDCCH search spaces.

TABLE 6

| Search Space | Type | RNTI | Use Case |
| --- | --- | --- | --- |
| Type0-PDCCH | Common | SI-RNTI on a primary cell | Broadcast of System Information |
| Type0A-PDCCH | Common | SI-RNTI on a primary cell | Broadcast of System Information |
| Type1-PDCCH | Common | RA-RNTI or TC-RNTI on a primary cell | Msg2, Msg4 in RACH |
| Type2-PDCCH | Common | P-RNTI on a primary cell | Paging System Information change notification |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI or CS-RNTI | Group signaling |
| UE Specific | UE Specific | C-RNTI, MCS-C-RNTI or CS-RNTI | UE signaling (e.g., PDSCH/PUSCH) |

The SS set may be configured by system information (e.g., MIB) or UE-specific higher layer (e.g., RRC) signaling. S (e.g., 10) SS sets or less may be configured in each DL BWP of a serving cell. For example, the following parameters/information may be provided for each SS set. Each SS set may be associated with one CORESET, and each CORESET configuration may be associated with one or more SS sets.

searchSpaceId: this parameter/information indicates the ID of the SS set.

controlResourceSetId: this parameter/information indicates the CORESET associated with the SS set.

monitoringSlotPeriodicityAndOffset: this parameter/information indicates a PDCCH monitoring periodicity (in a unit of slot) and a PDCCH monitoring offset (in a unit of slot)

monitoringSymbolsWithinSlot: this parameter/information indicates first OFDMA symbol(s) for PDCCH monitoring in a slot in which the PDCCH monitoring is configured. The first OFDMA symbol(s) are indicated by a bitmap, and each bit corresponds to each OFDMA symbol in the slot. The MSB of the bitmap corresponds to the first OFDM symbol in the slot. OFDMA symbol(s) corresponding to bit(s) with a value of 1 corresponds to the first symbol(s) in the CORESET in the slot.

nrofCandidates: this parameter/information indicates the number of PDCCH candidates (e.g., one of 0, 1, 2, 3, 4, 5, 6, and 8) for each AL (where AL={1, 2, 4, 8, 16}).

searchSpaceType: this parameter/information indicates whether the SS type is the CSS or USS.

DCI format: this parameter/information indicates the DCI format of a PDCCH candidate.

The UE may monitor PDCCH candidates in one or more SS sets in a slot according to the configuration of the CORESET/SS set. An occasion (e.g., time/frequency resource) to monitor PDCCH candidates is defined as a PDCCH (monitoring) occasion. One or more PDCCH (monitoring) occasions may be configured within a slot.

1. Control Channel Monitoring in High Frequency Band

The above description may be applied in combination with the methods proposed in the present disclosure to be described later, or may be supplemented to clarify the technical characteristics of the methods proposed in the present disclosure.

In addition, the methods to be described later may be equally applied to the above-described NR system (licensed band) or shared spectrum, and may be modified or replaced to fit the terms, expressions, structures, and the like defined in each system to implement the technical idea proposed in the present specification in the corresponding system.

In a NR system, multiple numerologies (or subcarrier spacing (SCS)) are supported to support a variety of 5G services. For example, a wide area in typical cellular bands is supported for an SCS of 15 kHz, a dense-urban area, a lower latency, and a wider carrier bandwidth are supported for an SCS of 30 kHz/60 kHz, and a larger bandwidth than 24.25 GHz is supported for an SCS of 60 kHz or more. An NR frequency band up to Release 16 may be defined as two types of frequency ranges (FR1 and FR2) and may be configured as shown in Table 3. In addition, discussions are going on to support future NR systems in a frequency band defined in FR1/FR2 or higher (e.g., 52.6 GHz to 71 GHz).

A higher frequency band than FR1 and FR2 bands (e.g., 52.6 GHz to 114.25 GHz band, particularly 52.6 GHz to 71 GHz) may be referred to as FR2-2. Waveforms, SCS, CP length, timing, etc. defined for FR1 and FR2 in the existing NR system may not be applied to FR2-2.

SCS of 120 kHz, 480 kHz, and 960 kHz may be used for an operation of the NR in an FR2-2 band. In the case of SCS of 480 kHz and 960 kHz, the length of an OFDM symbol may be shorter than that of 120 kHz. For example, an OFDM symbol of 480 kHz is ¼ the length of an OFDM symbol of 120 kHz, and an OFDM symbol of 960 kHz is ⅛ times of the length of an OFDM symbol of 120 kHz. For a short-length slot to which 480 kHz and 960 kHz are applied, when a PDCCH monitoring operation is performed in all slots, the UE may have a burden such as power consumption. Therefore, when SCS of 480 kHz and/or 960 kHz is configured, multi-slot PDCCH monitoring may be introduced.

Multi-slot PDCCH monitoring refers to an operation of performing PDCCH monitoring by determining blind decoding (BD)/control channel element (CCE) limits based on a plurality of consecutive slots and/or on a basis of a plurality of consecutive slots. In the conventional NR rel-15, BD/CCE limits may be determined in units of one slot, and in NR rel-16, BD/CCE limits may be determined in units of spans confined within one slot. The span may mean a PDCCH monitoring unit including consecutive symbols.

Hereinafter, PDCCH monitoring performed in units of slots may be expressed as per-slot monitoring, PDCCH monitoring performed in units of spans may be expressed as per-span monitoring, and PDCCH monitoring performed in units of slots-groups may be expressed as per-X monitoring.

BD limits refer to "Maximum number of monitored PDCCH candidates for a DL BWP with SCS configuration for a single serving cell" on the 3GPP standard, and CCE limits refer to "Maximum number of non-overlapped CCEs for a DL BWP with SCS configuration for a single serving cell" on the 3GPP standard.

A plurality of consecutive slots, which are a reference of multi-slot PDCCH monitoring, is referred to as a slot-group. A slot-group may include X consecutive slots, and BD/CCE limits may be defined in units of slot-groups. For example, for SCS of 480 kHz, BD/CCE limit per slot-group including X=4 slots may be defined. In addition, Y consecutive slots may be defined in a slot-group. There may be types of search space (SS) sets that are limited in such a way that PDCCH monitoring is performed only in Y slots. In a per-X monitoring operation, some parameters (e.g., periodicity, offset, or duration) of the SS set configuration need to be configured in units of X. For example, the periodicity may be configured as a value in units of slots in per-slot monitoring, but may be configured in units of X slots in per-X monitoring. For example, if X=8 is configured in a cell in which SCS of 960 kHz is used, a period value for per-X monitoring may include only a multiple of 8.

In per-X monitoring operating based on different Xs (or when the UE is reported to support a plurality of Xs), the BS may explicitly indicate a corresponding cell and/or an X value for SCS to the UE via separate RRC signaling or the like. When there is no separate instruction or before RRC signaling, the UE may determine and/or derive X actually used for a SS set configuration among the Xs reported to the BS through a value of the SS set configuration and may perform the per-X monitoring operation.

A UE (e.g., UE) configured with a multi-cell operation (e.g., carrier aggregation (CA)) may perform PDCCH monitoring for a plurality of cells. In this case, different SCSs may also be configured for each cell. When per-X monitoring is configured, per-X monitoring may operate based on different X values for each cell (even in the same SCS). Therefore, the X value may need to be indicated to the UE for each cell. Alternatively, for all cells in which different X values are configured, a reference X for which per-X monitoring is capable of operating may be required.

Hereinafter, in a situation in which different X values are reported, a method of determining a reference X used for configuring an SS set is proposed. In addition, a configuration method for SS set group switching introduced in Rel-16 to operate (multi-cell situation) for a plurality of Xs as described above is proposed.

In the Rel-15/16 NR operation, the SS set configuration for per-slot monitoring and per-span monitoring may be achieved by signaling information on a periodicity of PDCCH monitoring, an offset expressed in units of slots from a frame boundary, and a duration (Number of consecutive slots that a SearchSpace lasts in every occasion, i.e., upon every period as given in the periodicityAndOffset) indicating the number of slots in which SS sets are present within the period, to the UE through a related RRC parameter. The UE may determine a PDCCH monitoring occasion from a monitoring pattern within the periodicity, the offset, the duration, and the slot.

Per-X monitoring may be performed by PDCCH monitoring in a slot-group unit including X slots. According to an SS set type, in some SS sets, PDCCH monitoring may be performed only in Y slots in a slot-group. In slots other than Y slots among the X slots, some SS sets may not be monitored according to an SS set type. Accordingly, a SS set configuration parameter such as a periodicity for determining a PDCCH monitoring occasion (MO) position needs to be configured in units of X slots. Supportable X for each UE may be different, and the UE may report one or more supportable X values to the BS. The BS may configure an SS set based on one of the reported X values, and may transmit the configuration information to the UE via related RRC signaling.

A method of configuring a SS set configuration parameter (e.g., periodicity, offset, and/or duration) in units of X may have various forms. For example, a new RRC parameter having a value of X units may be defined instead of a conventional RRC parameter having a value of one slot unit. In addition, even if the conventional RRC parameter value in units of one slot is transmitted by the BS, the UE may apply a value obtained by multiplying the received RRC parameter value by X for each SCS (and using X reported or determined by the UE). It may also be possible to configure only a value that is a multiple of X for each SCS (and reported or determined by the UE) among the conventional RRC parameter values in units of one slot. It may be understood that an X unit configuration of the SS set configuration expressed in the proposed methods to be described below includes such a configuration method.

An SS set configuration for the per-X monitoring operation needs to be performed in units of X slots. Depending on an SS set type, MOs of some SS sets (which will be referred to as Group 2 SS for convenience) may be located anywhere in any slot of a slot-group including X slots. MOs of some other SS sets (which will be referred to as Group 1 SSs for convenience) may be located only in a specific Y slot within a slot-group. For example, group 1 SS may include Type 1 CSS with dedicated RRC configuration and type 3 CSS, UE specific SS. Group 2 SS may refer to Type 1 CSS without dedicated RRC configuration and type 0, OA, and 2 CSS.

Hereinafter, an SS set configuration method for per-X monitoring (operating in a multi-cell environment) will be described by dividing the method into group 1 SS and group 2 SS.

(Proposal 1) When the UE reports plural X values (that it is supported) for the per-X monitoring operation, the configuration (e.g., periodicity, offset, or duration) for the group 1 SS may be configured based on the minimum value among the reported Xs, and the UE may determine the PDCCH MO based on the minimum X value.

In order to make the MO of the group 1 SS exist only in the Y slot among the X slots, the SS set configuration (e.g., periodicity, offset, and/or duration) values for the corresponding SSs need to include only a multiple of X. When the UE reports many supportable Xs for per-X monitoring for specific SCS (or reports optional Xs in addition to the mandatorily supported Xs), the BS may determine X as a reference for SS set configuration in units of X, and the BS may also determine an MO based on the same X.

For example, for per-X monitoring operating at SCS of 960 kHz, if the UE reports that X=8 and X=4 are supportable, the MO configured based on X=4 may exist every 4 slots. (e.g., periodicity is a multiple of 4), and an MO configured based on X=8 may exist every 8 slots (e.g., periodicity is a multiple of 8). Therefore, the SS set configuration needs to be configured based on X=4, which is a common divisor of two X values, and the UE needs to determine the MO assuming the corresponding X=4. If the X values reported by the UE are all in the form of powers of 2, since the small value is always a divisor of the large value, the SS set configuration may be made based on the minimum value among the reported X values. For the per-X monitoring operation in which different Xs are to be reported, the SS set configuration for the group 1 SS may be configured based on the minimum value among the X values reported by the UE. In addition, the UE may determine the MO assuming that SS configuration (e.g., periodicity, offset, or duration) is made based on the minimum X value.

In addition, the UE may be indicated with the X value, which is the reference of the SS set configuration (periodicity, offset, and/or duration) for per-X monitoring operation for multiple cells, from the BS (via RRC or DCI). The UE may recognize that the SS set configuration is made according to the indicated value of X, and may determine the MO accordingly. As for the minimum X value, a default value (which is to be used when indication is not received from the BS) may be used.

(Proposal 1a) For the per-X monitoring operation, the configuration (e.g., periodicity, offset, and/or duration) for the group 1 SS may be configured based on the minimum value among X values supportable in the per-X monitoring operation for each SCS, and the UE may determine the PDCCH MO based on the minimum X value.

In order to make the MO of the group 1 SS exist only in the Y slots in the X slots, the SS set configuration (e.g., periodicity, offset, and/or duration) values for the SSs need to include only a multiple of X. X that is supportable for per-X monitoring operation may be predetermined for each SCS. For example, a per-X monitoring operation for 960 kHz may be defined and/or configured based on X=8 and/or X=4, and a per-X monitoring operation for 480 kHz may be defined and/or configured based on X=4 and/or X=2. The UE may report a preferred X for the per-X monitoring operation to the BS for each SCS. In addition, the X value may be plural for each SCS.

The SS set configuration may be configured and/or defined based on a minimum value among a plurality of X values. In other words, regardless of the X reported by the UE to the BS, the SS set configuration may be configured and/or defined based on the minimum value among Xs (or (X, Y)) defined for the corresponding SCS in a relevant NR specification.

For example, when X=8 and X=4 (or (X, Y) combination including X=8 or X=4) in per-X monitoring for SCS of 960 kHz is defined in the specification, even when the UE reports that X=8 is supported and does not report that X=4 is supported, the BS may make the SS set configuration based on X=4. When SS set configuration is performed based on X=4, an SS set configuration parameters such as periodicity, offset, and duration may be configured and/or indicated as one of multiples of 4. Alternatively, when the SS set configuration is performed based on X=4, the BS may define a value set of parameters such as (e.g.,) periodicity, offset, and duration with values including multiples of 4, and may configure and/or indicate one value thereamong to the UE.

In another example, when X=8 and X=4 (or (X,Y) combination including X=8 or X=4) for per-X monitoring for SCS of 960 kHz is defined in the specification, in a situation in which X=8 is a mandatory support element that needs to be supported by the UE, and X=4 is an optional support element that is to be supported by only some UEs, even if the UE does not report that X=4 as an optional support element is supported, since X=4 for the corresponding SCS is a value for enabling an operation defined in the specification, the SS set configuration (e.g., periodicity, offset, and/or duration.) may be configured based on X=4.

According to an embodiment therefor, when (X,Y) is defined for per-X monitoring for 480/960 kHz as follows,

TABLE 7

Supported combinations of (X,Y)
A UE capable of multi-slot monitoring mandatorily supports
  For SCS 480 kHz: (X,Y) = (4,1)
  For SCS 960 kHz: (X,Y) = (8,1)
A UE capable of multi-slot monitoring optionally supposts
  For SCS 480 kHz: (X,Y) = (4,2)
  For SCS 960 kHz: (X,Y) = (8,4), (4,2), (4,1)

The SS set configuration may be made based on X=4 for SCS of 480 kHz and may be made based on X=4 for SCS of 960 kHz. When (2,1) is added to a (X,Y) combination that is optionally supported for 480 kHz, the SS set configuration for 480 kHz may be made based on X=2.

In addition, for the per-X monitoring operation for multiple cells (instead of performing the SS set configuration based on the minimum value among the reported X values as in the (Proposal 2) method described below), similarly to proposal 1a, the SS set configuration may be made based on the minimum value among X values supported by per-X monitoring for each SCS (regardless of whether the UE reports a specific X value, and/or regardless of the mandatory/optional supported X). When the SS set configuration is performed based on the minimum value among the X values supported by the SS set configuration, parameters of the SS set configuration may be configured as one of multiple values of the minimum value of X. Alternatively, the BS may configure and/or indicate one of the value sets including multiple values of the minimum value of X to the UE.

Although it has been described that the proposed content is applied to the group 1 SS, the corresponding SS set type is not limited to the group 1 SS. For example, the proposal may be applied only to a Type-3 CSS set and/or a UE specific SS.

(Proposal 2) When X is different for each cell for a per-X monitoring operation (for multiple cells), the configuration (periodicity, offset, and/or duration) for the group 1 SS may be configured based on the minimum value among Xs for each cell, and the UE may determine the PDCCH MO based on the minimum X value.

When the UE is configured with per-X monitoring (for multiple cells), X for each cell may be different. For example, for two cells in which SCS of 960 kHz is configured, when cell #0 is configured with X=4, and cell #1 is configured with X=8, the MO for cell #0 may exist every 4 slots (the periodicity is a multiple of 4), the MO for cell #1 may exist every 8 slots (the periodicity is a multiple of 8). Therefore, in order to monitor both cell #0 and cell #1, the UE needs to operate assuming an MO according to X=4, which corresponds to a common divisor (or minimum value) of two X values. That is, for a multi-cell operation having different X values, the SS set configuration for the group 1 SS for the per-X monitoring operation may be configured based on the minimum value among X values for each cell. In addition, the UE may determine the MO assuming that the SS configuration (e.g., periodicity, offset, and/or duration) is made based on the minimum value among the X values.

In addition, the UE may be indicated with an X value, which is a reference of the SS set configuration (some or all of periodicity, offset, and duration) for the per-X monitoring operation for multiple cells from the BS (via RRC or DCI). The UE may recognize that the SS set configuration is made according to the indicated value of X, and may determine the MO accordingly. In this case, the minimum value among the X values may be used as a default value (which is to be used when indication is not received from the BS).

The proposed method is not limited only when per-X monitoring operates for multiple cells. That is, the proposed method may be equally applied to per-X monitoring for a single cell. In addition, the above-described proposed method is not limited to a case where all Xs are different for each cell even when per-X monitoring operates for multiple cells. That is, the methods may be equally applied to the case in which all Xs are the same for each cell, the case in which all Xs are different for each cell, and the case in which the X for some cells is the same and the Xs for some other cells are different. Those skilled in the art may fully understand that some expressions of the above-described proposed method do not necessarily mean a situation limited to the corresponding expressions.

(Proposal 3) When X for each cell is different for the per-X monitoring operation (for multiple cells), the configuration (periodicity, offset, and/or duration) for the group 2 SS may be configured based on X=1 (i.e., slot unit) or may be configured based on a minimum value among X values for each cell, and the UE may determine a PDCCH MO based on X=1 or a minimum value among X values for each cell.

The group 2 SS may correspond to SS set types used when only a cell-specific RRC configuration is configured for an arbitrary UE as a target without a dedicated RRC configuration or SS set types that the commonly configured to a plurality of UE groups. Thus, for an SS set belonging to the group 2 SS, when parameter values of the SS set configuration (e.g., periodicity, offset, and/or duration) for per-X monitoring for multiple cells are configured based on a specific X value, the UE that does not support the corresponding specific X value may not accurately determine an MO location without omission. As a method to solve this problem, for the group 2 SS, an SS set configuration may be made using one of the following three methods. The following methods may be applied to all SS set types belonging to the group 2 SS, or some methods may be applied only to a specific SS set type.

(Method 3-1) The SS set configuration (e.g., periodicity, offset, and/or duration) may be configured based on X=1, and the UE may determine the MO assuming that the SS set configuration is based on X=1. In this case, the meaning of configuring X=1 as a reference may be understood to mean that the SS set configuration is performed in units of slots in the same way as in the existing per-slot monitoring.

(Method 3-2) The SS set configuration (e.g., periodicity, offset, and/or duration) may be configured based on the minimum value of X at which per-X monitoring operation is to be configured for specific SCS. The UE may determine the MO assuming that the SS set configuration of the per-X monitoring operation for the specific SCS is made based on the minimum X value at which the per-X monitoring operation is to be configured for the specific SCS. For example, for per-X monitoring operating at SCS of 960 kHz, if the X value for each cell is only X=8 or X=4, the SS set configuration for the group 2 SS in per-X monitoring for multiple cells may be made based on X=4, and assuming this, the UE may determine the MO location.

(Method 3-3) For SS set types commonly configured to a plurality of UE groups, the SS set configuration (e.g., periodicity, offset, and/or duration) may be configured based on the minimum value among all X values to be reported by UEs included in the corresponding UE groups.

For example, when the minimum value among X values reported by UE #1 for a specific SCS of a specific cell is 4 and the minimum value among X values reported by UE #2 for a specific SCS of a specific cell is 8, the SS set configuration may be made for the specific SCS of the specific cell based on 4. The UE may determine the MO assuming that the SS set configuration of the per-X monitoring operation for a specific SCS is made based on the minimum value among the reportable X values.

The proposed method is not limited only when per-X monitoring operates for multiple cells. That is, the proposed method may be equally applied to per-X monitoring for a single cell. In addition, the above-described proposed method is not limited to a case where all Xs are different for each cell even when per-X monitoring operates for multiple cells. That is, the methods may be equally applied to the case in which all Xs are the same for each cell, the case in which all Xs are different for each cell, and the case in which the X for some cells is the same and the Xs for some other cells are different. Those skilled in the art may fully understand that some expressions of the above-described proposed method do not necessarily mean a situation limited to the corresponding expressions.

(Proposal 4) In the case of different X values for each cell in a situation of multiple cells, SS set group switching may be performed at a slot-group boundary corresponding to the largest X.

Search space set group (SSSG) switching is a feature introduced in rel-16 NR-U, and when a group including a specific (single or multiple) SS set configuration is pre-defined (different SS set configurations are made for each group), the UE may vary an operation periodicity of PDCCH monitoring according to the ID (or index) of the SSSG. In rel-16, SSSG switching may be applied in Type-3 CSS set and USS. In this case, for per-slot monitoring, switching between different SSSGs may be performed at a slot boundary. For example, after SSSG switching is triggered, PDCCH monitoring may be performed according to the SSSG to be changed from a first slot after more than Pswitch symbols passes. However, in the case of per-X monitoring, if the SS set configuration is changed in the middle of a slot-group, the complexity of the UE may increase, and accordingly, in order to avoid this, switching between SSSGs needs to be performed at the slot-group boundary.

When the UE is configured to operate multiple cells, X for per-X monitoring may be different for each cell. In this case, an SSSG switching time may be determined in two different ways. Cells having different Xs, referred to in a method to be described later, may mean cells belonging to the same cell group for SSSG switching.

(Method 4-1) When the value of X is different for each cell, SSSG switching may be performed at a boundary of different Xs (i.e., slot-group) for each cell. As an example thereof, for the case where cell #0 is X=4 and cell #1 is X=8, a situation in which both cell #0 and cell #1 are switched to SSSG #0→SSSG #1 through one SSSG switching triggering may be considered. Both cell #0 and cell #1 may start PDCCH monitoring according to SSSG #1 at a first slot-group boundary after a Pswitch symbol passes after switching is triggered, but since a slot-group of cell #0 includes 4 slots, and a slot-group of cell #1 includes 8 slots, an actual switching time to SSSG #1 may be different from each other as shown in FIG. 4.

(Method 4-2) Even when the X value is different for each cell, SSSG switching may be performed on all cells monitored by the UE at an X boundary (i.e., a slot-group boundary) based on a reference X. The reference X may be the largest X among Xs to be supported by the corresponding UE (or among Xs of cells monitored by the corresponding UE). For example, in the situation of cell #0 and cell #1 exemplified in Method 4-1, when SSSG switching is performed based on X=8 of cell #1, cell #0 may also be changed to SSSG #1 at a slot-group boundary of cell #1. As such, SSSG switching may be performed at the same time for all cells monitored by the corresponding UE. An effect obtained by matching the SSSG switching timing for multiple cells to the same time is as follows, for example. During the channel occupancy (CO) duration in an unlicensed band (or shared spectrum), SSSG switching may be used before and after a CO section for reducing a frequency of PDCCH monitoring. Like CA, in a transmission process using multiple cells, the CO section for a plurality of cells may be configured to end at the same time, and in this case, the UE operation may be advantageously simplified by matching the SSSG switching time between the cells.

In addition, it may be possible to flexibly change Method 4-1 and Method 4-2. That is, the BS may indicate whether an SSSG switching time of each cell is a boundary of different Xs for each cell or a boundary of a reference X (e.g., largest X) to the UE through higher layer signaling such as RRC. Alternatively, a 1-bit field may be added to DCI format 20 capable of triggering SSSG switching, and information indicating one of Method 4-1 and Method 4-2 may be transmitted through the added 1-bit field. As such, when an individual CO section is obtained for each beam, there is an advantage that an SSSG switching time is to be individually configured for each beam. As another method, one of the methods 4-1 and 4-2 may be pre-defined according to the SSSG switching trigger type. For example, when switching is triggered through DCI 2_0, etc., the switching time points of all cells are aligned with the largest X boundary, and when switching is triggered through SSSG switching timer expire, SSSG switching may be performed at a boundary between different Xs for each cell. Alternatively, in an unlicensed band (or shared spectrum) operation, SSSG switching may be performed for each cell at an X boundary of each cell when entering the CO section, and switching times may be matched with each other according to the largest X in all cells when switching is triggered due to end of the CO section. As such, unnecessary power consumption may be reduced during the CO section, and when the CO section ends, all cells may perform SSSG switching at the same time, thereby reducing the complexity of the UE operation.

The content of the present disclosure is not limited only to transmission and reception of uplink and/or downlink signals. For example, the content of the present disclosure may be used in direct communication between UEs. In addition, a BS in the present disclosure may be a concept including a relay node as well as a BS. For example, an operation of the BS in the present disclosure may be performed by the BS, but may also be performed by the relay node.

Since examples of the above-described proposed method may also be included as one of the implementation methods of the present disclosure, it is obvious that the examples may be regarded as a kind of proposed method. In addition, the above-described proposed methods may be implemented independently, but may also be implemented in the form of a combination (or merge) of some of the proposed methods. Rules may be defined in such a way that information on whether the proposed methods are applied (or information on the rules of the proposed methods) is informed by the BS to the UE or by a transmitting UE to a receiving UE through a predefined signal (e.g., a physical layer signal or a higher layer signal).

Embodiment

FIG. 5 is a flowchart of a method of transmitting and receiving a signal according to an embodiment of the present disclosure.

Referring to FIG. 5, the method according to an embodiment of the present disclosure may be performed by a UE and may include receiving a configuration for a search space set (S501) and monitoring a PDCCH based on a combination of X and Y (S503).

In addition to operations of FIG. 5, one or more of the operations described through chapter 1 may be additionally performed.

According to chapter 1, a slot-group including X consecutive slots may be configured for multi-slot PDCCH monitoring. In addition, Y slots for PDCCH monitoring of a specific type may be configured in X slots of a slot-group. Referring to FIG. 4, a slot-group including X slots may be continuously repeated without overlapping.

The UE may receive a configuration for the search space (SS) set from the BS and may determine X to be used for monitoring through the received configuration. Since Y is also determined based on the determined X, the UE may determine a combination of X and Y to be used for PDCCH monitoring based on the configuration for the SS set.

In order to monitor a PDCCH based on a combination of X and Y, parameters (information) included in the configuration for the SS set, for example, information on periodicity, offset and/or duration need to be configured based on X, and each of the proposed methods explains the corresponding references separately. Information on periodicity and offset may be included in the monitoringSlotPeriodityAndOffset parameter together. The information on the duration may be included in the duration parameter separately from the monitoringSlotPeriodityAndOffset parameter.

According to Proposal 1a of the proposed methods, values for periodicity, offset, and/or duration need to include only a multiple of a specific X value (hereinafter L). The L value among the possible X values may be determined as the minimum value among Xs supportable for SCS in a wireless communication system regardless of the X values that the UE reports as supportable with UE capability.

For example, as shown in Table 7, a combination of X and Y supported for SCS of 480 kHz in a wireless communication system may include a combination of 4 and 1, and a combination of 4 and 2, and a combination of X and Y for supporting SCS of 960 kHz may include a combination of 4 and 1, a combination of 4 and 2, a combination of 8 and 1, and a combination of 8 and 4.

Accordingly, the minimum value of X supported by the wireless communication system for SCS of 480 kHz and SCS of 960 kHz is 4 in common. Accordingly, values for periodicity, offset, and/or duration included in the configuration of the SS set may be configured to a multiple of 4. In Proposal 1a, since the L value is independent of the capability report of each UE, even if there is no 4 among the X values reported by the UE, the values for periodicity, offset, and/or duration included in the configuration of the SS set are multiples of 4 may be configured to be multiples of 4. Periodicity and offset are configured based on a single parameter, and thus the value of monitoringSlotPeriodity-AndOffset, which is a corresponding single parameter, may be configured as a multiple of 4. In other words, periodicity and offset may be restricted to be an integer multiple of L, and L may be 4. Since duration is configured based on a duration parameter, the value of the duration parameter may be restricted to be an integer multiple of 4. In other words, the duration may be restricted to be an integer multiple of L, and L may be 4.

Proposal 1a may be for a configuration of the group 1 SS, and the group 1 SS may be pre-defined as a set of SS sets monitored only in Y slots based on a combination of X and Y configured in the UE. As an example of the group 1 SS, a type 1 CSS set, a type 3 CSS set, and a USS set by the dedicated RRC configuration are exemplified above.

Referring to Proposal 1, information on an X value, that is, an L value, which is a reference of the SS set configuration, may be transmitted from the BS to the UE through RRC signaling. This may also be effectively used for Proposal 1a. Accordingly, the UE may receive information on the L value from the BS through RRC signaling.

Referring to Method 3-3, an L value may be determined as the smallest value among X values reported by a plurality of UEs. Accordingly, even if the minimum value among X values reported by a specific UE is 8, if the minimum value among the X values reported by other UEs is 4, the L value may be restricted to be an integer multiple of 4.

In addition to the operations described with respect to FIG. 5, one or more of the operations described with reference to FIGS. 1 to 4 and/or the operations described in chapter 1 may be combined and further performed.

Example of Communication System to which the Present Disclosure is Applied

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

FIG. 6 illustrates a communication system 1 applied to the present disclosure.

Referring to FIG. 6, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g., V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g., relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Example of Wireless Device to which the Present Disclosure is Applied

FIG. 7 illustrates wireless devices applicable to the present disclosure.

Referring to FIG. 7, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 6.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Example of Use of Wireless Device to which the Present Disclosure is Applied

FIG. 8 illustrates another example of a wireless device applied to the present disclosure. The wireless device may be implemented in various forms according to a use case/service (refer to FIG. 6).

Referring to FIG. 8, wireless devices 100 and 200 may correspond to the wireless devices 100 and 200 of FIG. 7 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 7. For example, the transceiver(s) 114 may include the one or more transceivers 106 and 206 and/or the one or more antennas 108 and 208 of FIG. 7. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 6), the vehicles (100b-1 and 100b-2 of FIG. 6), the XR device (100c of FIG. 6), the hand-held device (100d of FIG. 6), the home appliance (100e of FIG. 6), the IoT device (100f of FIG. 6), a digital broadcasting terminal, a hologram device, a public safety device, an MTC device, a medical device, a FinTech device (or a finance device), a security device, a climate/environment device, the AI server/device (400 of FIG. 6), the BSs (200 of FIG. 6), a network node, or the like. The wireless device may be mobile or fixed according to a use case/service.

In FIG. 8, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Example of Vehicle or Autonomous Driving Vehicle to which the Present Disclosure is Applied FIG. 9 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 9, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 8, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

As described above, the present disclosure is applicable to various wireless communication systems.

According to an embodiment of the present disclosure, a user equipment may monitor a control signal more efficiently in a different way from the prior art.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

What is claimed is:

1. A method of monitoring a control signal by a user equipment (UE) in a wireless communication system, the method comprising:

receiving a configuration for a search space set; and monitoring a physical downlink control channel (PDCCH) based on a combination of X and Y, wherein the X is a number of consecutive slots included in a slot-group, the slot-group is consecutively repeated without overlapping, and the Y is a number of consecutive slots within X slots, wherein the combination of the X and the Y is determined based on the configuration, wherein the configuration includes information on a duration of the search space set, and the configuration includes information on periodicity and offset of the search space set, the duration of the search space set is smaller than the periodicity of the search space set, wherein the duration of the search space set is restricted to be an integer multiple of L, and the periodicity and the offset of the search space set are restricted to be the integer multiple of the L, and wherein the L is 4.

2. The method of claim 1, wherein the PDCCH is monitored based on subcarrier spacing (SCS) of 480 kHz or SCS of 960 kHz.

3. The method of claim 1, wherein the L is a minimum value of X values to be supported for SCS in the wireless communication system.

4. The method of claim 3, wherein a combination of X and Y to be supported for SCS in the wireless communication system includes a combination of 4 and 1, and a combination of 4 and 2 for SCS of 480 kHz, and includes a combination of 4 and 1, a combination of 4 and 2, a combination of 8 and 1, and a combination of 8 and 4 for SCS of 960 kHz.

5. The method of claim 1, wherein the L is a minimum value of X values reported with UE capability by a plurality of UEs including the UE.

6. The method of claim 1, wherein the L is configured to 4 even if 4 is not included in one or more of the X values reported by the UE with the UE capability.

7. The method of claim 1, wherein the PDCCH is monitored in the Y slots.

8. The method of claim 1, wherein the search space set includes a type 1 common search space (CSS) set, a type 3 CSS set, and a UE-specific search space (USS) set according to a dedicated radio resource control (RRC) configuration.

9. The method of claim 1, wherein the L is received from a base station (BS) via radio resource control (RRC) signaling.

10. A user equipment (UE) for monitoring a control signal in a wireless communication system, comprising:

at least one transceiver;

at least one processor; and at least one memory operatively connected to the at least one processor and configured to store instructions for causing the at least one processor to perform a specific operation when being executed, wherein the specific operation includes:

receiving a configuration for a search space set; and monitoring a physical downlink control channel (PDCCH) based on a combination of X and Y, wherein the X is a value of consecutive slots included in a slot-group, the slot-group is consecutively repeated without overlapping, and the Y is a number of consecutive slots within X slots, wherein the combination of the X and the Y is determined based on the configuration, wherein the configuration includes information on a duration of the search space set, and the configuration includes information on periodicity and offset of the search space set, the duration of the search space set is smaller than the periodicity of the search space set, wherein the duration of the search space set is restricted to be an integer multiple of L, and the periodicity and the offset of the search space set are restricted to be the integer multiple of the L, and wherein the L is 4.

11. An apparatus for a user equipment (UE), comprising:

at least one processor; and at least one memory operatively connected to the at least one processor and configured to cause the at least one processor to perform an operation when being executed, wherein the operation includes:

receiving a configuration for a search space set; and monitoring a physical downlink control channel (PDCCH) based on a combination of X and Y, wherein the X is a number of consecutive slots included in a slot-group, the slot-group is consecutively repeated without overlapping, and the Y is a number of consecutive slots within X slots, wherein the combination of the X and the Y is determined based on the configuration, wherein the configuration includes information on a duration of the search space set, and the configuration includes information on periodicity and offset of the search space set, the duration of the search space set is smaller than the periodicity of the search space set, wherein the duration is restricted to be an integer multiple of L, and the periodicity and the offset of the search space set are restricted to be the integer multiple of the L, and wherein the L is 4.

* * * * *